United States Patent [19]

Huynh-Ba

[11] Patent Number: 5,478,887

[45] Date of Patent: Dec. 26, 1995

[54] BLENDS OF POLYCARBONATES WITH POLYAMIDES, HAVING HIGH IMPACT STRENGTH AND HIGH FLEXURAL MODULUS

[75] Inventor: Gia Huynh-Ba, Hockessin, Del.

[73] Assignee: E. I. Du Pont de Nemours and Company, Wilmington, Del.

[21] Appl. No.: 93,704

[22] Filed: Jul. 26, 1993

[51] Int. Cl.⁶ ................................. C08G 63/48
[52] U.S. Cl. ..................... 525/66; 525/67; 525/146; 525/148; 525/394; 525/424; 525/425; 525/432; 525/433
[58] Field of Search ............... 525/66, 67, 146, 525/148, 394, 424, 425, 432, 433

[56] References Cited

U.S. PATENT DOCUMENTS

| | | | |
|---|---|---|---|
| 4,782,114 | 11/1988 | Perron et al. | 525/66 |
| 5,008,347 | 4/1991 | Thill et al. | 525/433 |

*Primary Examiner*—James J. Seidleck
*Assistant Examiner*—Terressa M. Mosley

[57] ABSTRACT

A polymer blend comprising an aliphatic polyamide matrix and a dispersed phase of a polycarbonate and a compatibilizing agent having pendant succinic anhydride groups or epoxide groups, made under such blending conditions that the polymer stock melt temperature is 290°–350° C., has a combination of excellent toughness and stiffness properties.

9 Claims, 4 Drawing Sheets

FIG. 3A

BLENDS OF POLYCARBONATES WITH POLYAMIDES, HAVING HIGH IMPACT STRENGTH AND HIGH FLEXURAL MODULUS

BACKGROUND OF THE INVENTION

This invention relates to a process for making blends of polycarbonates with certain polyamides, which blends have high notched Izod impact strength and frequently also an unexpectedly high flexural (or flex) modulus.

It is well known in the polymer industry to make polymer blends that have improved properties, when compared with the properties of the individual blend components. For example, it is a common practice to blend engineering resins such as, for example, polyamides, polyesters, or polycarbonates with low flex modulus, soft, rubbery polymers in order to improve their toughness (or impact strength). U.S. Pat. Nos. 4,172,859 and 4,174,658, both to Epstein, represent what is believed to be the most successful earlier work in this area. For the purpose of this invention, a polymer blend which has a notched Izod impact strength of at least 10 ft.lb/in (534 J/m), as determined according to ASTM Standard D256, is considered to be "supertough". Most Epstein blends are supertough.

While the starting engineering resins have high flex modulus, the flex modulus of the toughened engineering resins ordinarily is decreased, sometimes significantly. In some applications, this is not considered a drawback, but in some other applications such as, for example, machine parts or automobile parts, this would be a drawback.

Blends of crystalline polyamides, such as, for example, nylon 6 with polycarbonates also are known; see, for example, U.S. Pat. Nos. 4,782,114 to Perron and 5,008,374 to Thill. Such blends normally also contain a third and in some cases a fourth component, which is a polymeric compatibilizing agent, having low glass transition temperature and low flex modulus. Those blends have very high impact strength, but their flex modulus always is lower, sometimes significantly so, than that of the starting polyamide. The starting polycarbonate itself most often has a flex modulus that is lower than that of the polyamide, and the flex modulus of the blend can be lower than that of the polycarbonate as well, so that in this case, the final composition may not have sufficient stiffness for those special applications.

It is customary in the industry to make polymer blends at the lowest temperature at which they can be melt processed, usually about 10°–60° C. above the melting temperature of the highest melting polymer. In the case of nylon 6, which melts at about 220° C., the processing temperature normally is no higher than about 260° C., although Perron describes operations at temperatures as high as 287° C.

Certain aliphatic polyamides such as, for example, nylon 11, nylon 12, and nylon 12,12, have rather low flex moduli, which would be considered marginal in many engineering resin applications. Those polyamides can be readily toughened to high values, but their stiffness normally decreases below acceptable level. Blends of such polyamides with polycarbonates and toughening agents do not have a satisfactory toughness/stiffness combination.

There is a need, therefore, for a blend of such polyamides with a polycarbonate that would not only have high impact strength but also high stiffness.

SUMMARY OF THE INVENTION

According to the present invention, there is now provided a process for making a supertough polymer blend composition, said process consisting in blending the following components A, B, and C in the indicated proportions:

C, 2–30% of an engineering grade polycarbonate resin;

B, 3–20%, total, of at least one elastomeric compatibilizing agent carrying 0.1–5% of at least one type of pendant groups selected from the class of succinic anhydride and epoxide groups; and A, 50–95% of an engineering grade polyamide resin selected from the group consisting of nylon 6, nylon 11, nylon 12, nylon 6,12, nylon 12,12, and mixtures of two or more of those polymides; the amount of polyamide A always being equal to 100% -(B%+C%);

all the above percentages being by weight;

under such conditions that the stock melt temperature is about 290° C. to 350° C., for a sufficient time to obtain a uniform dispersion of the polycarbonate and compatibilizing agent in polyamide matrix;

the resulting blend having a flexural modulus, as determined according to the ASTM Standard D790, that is always at least as high as the lower of that of the polyamide and of the polycarbonate:

said blend consisting essentially of a polyamide matrix and a dispersed phase consisting of the polycarbonate and the compatibilizing agent.

There also is provided a polymer blend composition made by the above process,

DETAILED DESCRIPTION

The polyamides suitable in the blend compositions of the present invention are commonly known and employed as engineering resins. They are semicrystalline or crystalline polymers, with melting points above 170° C. Such polyamides frequently are referred to in the industry as nylons. Those used in the present invention are commercially available. Nylon 6,6 (polyhexamethylene adipamide) is not suitable in the process of the present invention because it is not sufficiently thermally stable to be processed at the high temperatures required in the present invention. The preferred polyamide is nylon 6 because it has a good flex modulus, is industrially used in large volume as an engineering resin, and is for that reason readily available from several sources.

The polycarbonates suitable in the practice of the present invention are well known and many are commercially available, among others, from General Electric Co. They also are sometimes known as polyarylates. Polycarbonates are derived from cyclic, usually aromatic, diols and carbon dioxide and normally are made by a reaction of the diol with phosgene or a chloroformate. Typical aromatic diols that are used in the manufacture of polycarbonates are dihydroxybenzenes, especially resorcinol, diphenols, Bisphenol A, and Bisphenol F. Commercially available polycarbonates are amorphous resins, which crystallize on annealing. They retain their amorphous state during melt processing.

The compatibilizing agent is a functionalized rubber such as, for example, maleated EP or EPDM rubber or maleated styrene-butadiene rubber, maleated styrene/ethylene/butylene-1 rubber, and maleated styrene/ethylene/propene rubber. The acronyms EP and EPDM are known in the industry. The former stands for an ethylene/propylene copolymer; the latter stands for a terpolymer or tetrapolymer of ethylene with propylene and with a diene having only one terminal double bond, which may also contain a fourth ethylenically unsaturated monomer. The succinic anhydride group can be introduced into the elastomer either by copolymerization with a monomer such as maleic anhydride, fumaric acid, maleic acid, monomethyl maleate, or itaconic acid or by grafting an elastomeric material with maleic anhydride or with fumaric acid, as is well known in the art.

Other compatibilzing agents include elastomeric materials containing both succinic anhydride groups and carbon monoxide groups such as, for example, maleated ethylene/butyl acrylate/carbon monoxide terpolymer. Still further compatibilizing agents can contain epoxy groups such, for example, ethylene/butyl acrylate/glycidyl methacrylate terpolymer, ethylene/butyl acrylate/carbon monoxide terpolymer grafted with glycidyl methacrylate, and EP or EPDM rubber grafted with glycidyl methacrylate. All such copolymers are well known and some are commercially available.

Preferably, the amount of pendant succinic anhydride and/or epoxide groups is 0.3–3%.

The preferred nylon 6 or nylon 6,12 composition consists of 70–85% of nylon, 10–15% of compatibilizing agent, and 5–15% of polycarbonate. The preferred compositions containing nylon 11, nylon 12, or nylon 12,12 consist of 55–90% of polyamide, 5–15% of compatibilizing agent, and 5–30% of polycarbonate.

In the practical operation of the process of the present invention, the components are fed directly to the blending equipment, usually an extruder, although other blending equipment such as a Banbury mixer or a rubber mill can be used as well. A two-step process involving preblending of the polycarbonate with the compatibilizing agent also is possible but would be more expensive than direct blending.

The extruder temperature is set at a sufficiently high temperature to obtain a stock melt temperature of 290°–350° C. The actual machine setting normally will be below the desired value, but further temperature increase is caused by the high shear. Once the machine parameters such as temperature, extrusion rate, and revolutions per minute are set, they are maintained constant throughout the operation.

For a given nylon, the flex moduli of the blends of the present invention are to a large degree dependent on the relative proportions of their components and especially on the amount of the compatibilizing agent. But, generally speaking, depending on the particular polymers, and especially the particular nylon used, one of three situations may occur: (a) the final flex modulus is higher than the flex modulus of both the starting polyamide and the starting polycarbonate; (b) the final flex modulus is lower than that of the starting polyamide but higher than that of the starting polycarbonate; or (c) the final flex modulus is lower than that of the starting polycarbonate but higher than that of the starting polyamide (when the polyamide is nylon 11, nylon 12, or nylon 12,12). The process of the present invention can in each one of those three situations produce a blend that has high impact strength and the highest attainable flex modulus for a given composition.

Under the process conditions of the present invention, polyamide always forms the matrix and polycarbonate and the compatibilizing agent the dispersed phase. This can be readily ascertained by a conventional technique such as, for example, scanning electron microscopy (SEM), without and with chloroform extraction. Chloroform extracts polycarbonate but does not dissolve polyamide. Comparison of SEM photomicrographs before and after extraction will prove that this requirement has been met.

While the inventor does not know why the process conditions described and claimed herein produce blends which have high Izod impact strengths and high flex moduli, he has established, nevertheless, that certain chemical changes occur in those blends as a result of exposure to simultaneous high temperature and high shear. Three different techniques, differential mechanical analysis, infrared spectroscopy, and nuclear magnetic resonance spectroscopy, have been used to show those changes, although their chemical significance still is not understood.

This invention is now illustrated by the following examples of certain representative embodiments thereof, where all parts, proportions, and percentages are by weight unless otherwise indicated. All data of weight and measure not originally obtained in SI units have been converted to SI units.

I) GLOSSARY OF POLYMERS

A) POLYMER A: POLYAMIDE

A1: Nylon 6 with relative viscosity, RV, (ASTM Standard D- 789) about 58–62. Available from Nylon de Mexico, S.A. under the trademark and grade designation DURAMIDA® 6.

A2: Nylon 12,12, formerly offered by Du Pont of Canada under the trademark and grade designation ZYTEL® 1212. It had an inherent viscosity, IV, of 1.2 dl/g, and a specific gravity of 1.022 g/cm$^3$.

A3: Nylon 12, made by Atochem USA under the trademark AECNO RILSAN® TL. It has a melting point of 174° C. and a specific gravity of 1.02 g/cm$^3$.

B) POLYMER B: COMPATIBILIZING A GENT

B1: EPDM rubber containing about 0.12 % of copolymerized norbornadiene, grafted with a monomer providing about 2 % of succinic anhydride groups (maleic anhydride, maleic acid, or fumaric acid).

B2: EPDM rubber similar to B1, except that it had a slightly lower molecular weight than B1; grafted to contain about 2% of succinic anhydride groups.

B3: The same EPDM as B1, but grafted with 0.73% of glycidyl methacrylate. It had a melt flow rate, MFR, at 280° C. of 0.09 dg/min.

B4: A terpolymer of ethylene with n-butyl acrylate and carbon monoxide (an E/n-BA/CO terpolymer) in their respective amounts of 60:10:30%, grafted with 0.8 % of maleic anhydride. It had an MFR at 190° C. of 6.5 dg/min.

B5: A terpolymer of ethylene with n-butyl acrylate and glycidyl methacrylate (an E/n-BA/GMA terpolymer) in their respective amounts of 66.8:28: 5.2%. It has a Tg of about −60° C.

B6: An E/n-BA/GMA terpolymer, with respective comonomer amounts of 72.6:26:1.4 %.

B7: A styrene/ethylene-butylene/styrene copolymer, grafted with about 2% of maleic anhydride, available from Shell Chemical Company under the trademark KRATON® FG 1901X.

C) POLYMER C: POLYCARBONATE

C1: Polycarbonate, available from General Electric Company under the trademark and grade designation LEXAN® 101. It has a MFR at 300° C. of 6.5 dg/min.

C2: Polycarbonate, available from the same source as LEXAN® HF1110. It has a MFR of 22 dg/min.

II) EXTRUDER

M1: A Werner&Pfleiderer (W&P) twin-screw extruder equipped with bilobal 30-mm diameter screws and divided into four zones set at the same temperature. The extruder has a vacuum port at the end.

M2: A W&P twin-screw extruder equipped with trilobal 28mm diameter screws and divided into five heating zones. It has a vacuum port a the end.

M3: A twin screw, "ZSK", W&P extruder equipped with 53mm diameter trilobal mixing screws and divided into ten heating zones. It has a vacuum port at the end.

M4: A twin screw, "ZSK" W&P extruder equipped with 40mm diameter bilobal screws and divided into five heating zones. It has a side feed port for glass fibers and a vacuum port at the end. It has a rated throughput capacity of about 30 kg/hr.

Note: The the term "stock polymer temperature", used in the examples, means the temperature of the polymer exiting the die, measured with a hand-held thermocouple. Each extruder was operated at a set temperature such that the stock polymer temperature at the given shear rate was at the desired level within the 290° C.–350° C. range.

III) MOLDING

Extruded and pelletized polymers were dried overnight at 90°– 110° C. They were injection molded in a nominal 6-ounce (177-ml) machine made by HMP Company, running at a cycle ratio of 20 see/20 sec. The actual melting temperature for each nylon during molding was determined with a hand-held device. The mold cavity temperature was about 40–60° C. The molding specimens were 0.3175 cm thick and either flex bar type (1.27×11.43cm) or dog bone type (1.27×21.6 cm).

IV) TESTING a) Flexural (flex) modulus was determined according to ASTM D-790.

b) Notched Izod impact strength was determined according to ASTM D-256.

c) Tensile strength and elongation at break were determined according to ASTM D-638.

The above determinations (a) through (c) were made on "dry as molded" samples.

EXAMPLES 1 AND 2

These examples show an unexpected combination of high stiffness and toughness of the blends. In each run, the total weight of each sample was from 4 to 5 kg. The compositions of Examples 1 and 2 were the same: A1/B1/C2, 80:10:10%.

Polymer A 1 pellets and Polymer C2 pellets were dried overnight under vacuum at 110° C. and fed, along with Polymer B1. The polymer blend was molded at two different set temperatures, with the mold temperature set at 60° C. Table 1, below, provides the experimental conditions and lists certain physical properties of those blends, as well as those of the starting polyamide A1, the starting polycarbonate C2, and a commercial supertough nylon. Both the notched Izod impact strength and the flex modulus of the blends of Examples 1 and 2 were surprisingly high. This is especially remarkable when compared with ZYTEL® ST801, which is considered to be a state of the art supertough nylon. The data for ZYTEL® ST801 are taken from the sales bulletin of E. I. du Pont de Nemours and Company.

TABLE 1

|  | Example | | | | |
| --- | --- | --- | --- | --- | --- |
|  | 1 | 2 | A1 | C2 | ST801[1] |
| Rev. per minute | 300 | 300 | N/A[2] | N/A[2] | N/A[2] |
| Production rate, kg/min | 9.1 | 9.1 | N/A[2] | N/A[2] | N/A[2] |
| Stock melt temp., °C. | 300 | 300 | N/A[2] | N/A[2] | N/A[2] |
| Extruder | M1 | M1 | N/A[2] | N/A[2] | N/A[2] |
| Molding temperature, °C. | 240 | 260 | 260 | 300 | 270 |
| Flex modulus, MPa | 2620 | 3172 | 2758 | 2310 | 1689 |
| Notched Isod, J/m | 1174 | 907 | 53.4 | 641 | 961 |
| Tensile strength, MPa | 64.1 | 71.0 | 82.7 | 85.5 | 51.7 |
| Elongation at break, % | 63 | 25 | 60 | 120 | 60 |

[1] Supertough ZYTEL® ST801 nylon from E.I. du Pont de Nemours and Company
[2] Not applicable because in these runs no compounding was done and each sample was molded without prior extrusion.

EXAMPLES 3–8

The following examples illustrate various types of compatibilizers that can be used to produce a blend with a good combination of stiffness and toughness. In each case, the composition was A1/B/C2, 80:10:10%. Table 2 provides the flex modulus and notched Izod values for blends in which the compatibilizer B was varied as shown. For completeness, Example 1 of Table 1 also should be considered, The extruder was M2.

TABLE 2

|  | Example | | | | | |
| --- | --- | --- | --- | --- | --- | --- |
|  | 3 | 4 | 5 | 6 | 7 | 8 |
| Rev. per minute | 140 | 200 | 200 | 200 | 200 | 200 |
| Prod. rate, kg/hr | 14.5 | 14.5 | 13.2 | 11.8 | 11.8 | 11.3 |
| Stock melt temp., °C. | 330 | 306 | 305 | 301 | 302 | 314 |
| Molding temp., °C. | 260 | 245 | 245 | 240 | 245 | 260 |
| Polymer B | B2 | B3 | B4 | B5 | B6 | B7 |
| Flex Mod., MPa | 2200 | 2379 | 2413 | 2413 | 2517 | 2689 |
| Notched Izod, J/m | 1068 | 1068 | 1068 | 673 | 694 | 587 |

It can be seen from Table 2 that different kinds of compatibilizer B can be used to give toughness ranging from about 600 to more than 1000 J/m, while flex modulus is about 2200–2700 MPa. Example 1 (Table 1) gave even higher impact strength and flex modulus values. Such a combination of high toughness and high stiffness for nylon 6 compositions is unusual.

EXAMPLES 9 AND 10

The following examples show that the molecular weight of polycarbonate (C1 or C2) is not critical. The results of these examples should be compared with those reported for Examples 1 and 8, above, where polycarbonate C was C2. The polyamide in all the examples was A1, and all the compositions were A/B/C, 80:10:10%. The experimental data and results are presented in Table 3, below.

TABLE 3

| Example | 9 | 10 |
|---|---|---|
| Rev./min. | 100 | 100 |
| Prod. rate, kg/hr | 7.3 | 6.4 |
| Stock melt temp., °C. | 290 | 292 |
| Extruder | M1 | M2 |
| Molding temp., °C. | 250 | 250 |
| Polymer C | C1 | C1 |
| Polymer B | B1 | B7 |
| Flex Modulus, MPa | 2620 | 2654 |
| Notched Izod, J/m | 1228 | 1041 |
| Tensile strength, MPa | 73.0 | 68.3 |
| Elongation at break, % | 50 | 30 |

EXAMPLES 11–17

Blends of Polymer A3, Polymer B1, and Polymer C1 or C2 were made in Extruder M 1 operated at 150 rev./min. Test samples were molded at 250° C. The relative amounts of the blend components were varied as shown in Table 4, below. Good stiffness and toughness were obtained through the entire range of those compositions.

TABLE 4

| | Example | | | | | | |
|---|---|---|---|---|---|---|---|
| | 11 | 12 | 13 | 14 | 15 | 16 | 17 |
| Prod. rate, kg/hr. | 8.6 | 9.3 | 9.3 | 9.3 | 9.4 | 9.7 | 9.9 |
| Stock melt temp., °C. | 311 | 310 | 309 | 310 | 310 | 310 | 311 |
| Polymer A3, % | 90 | 80 | 75 | 75 | 65 | 60 | 50 |
| Polymer B1, % | 5 | 5 | 5 | 10 | 10 | 10 | 10 |
| Polymer C2, % | 5 | 15 | 20 | 0 | 0 | 0 | 0 |
| Polymer C1, % | 0 | 0 | 0 | 15 | 25 | 30 | 40 |
| Flex modulus, MPa | 1379 | 1517 | 1586 | 1413 | 1413 | 1449 | 1482 |
| Notched izod, J/m | 1228 | 1281 | 801 | 1174 | 1121 | 961 | 801 |
| Tensile strength, MPa | 41.3 | 46.2 | 43.4 | 39.3 | 40.0 | 39.3 | 39.3 |
| Elongation at break, % | 200 | 150 | 75 | 150 | 90 | 70 | 100 |

The above results can be compared with similar data obtained for polyamide A3 alone (Contr. 1) and for a conventional impact-resistant polyamide (Comp. 1), which are given below in Table 5.

TABLE 5

| | Example | |
|---|---|---|
| | Contr. 1 | Comp. 1 |
| Prod. rate, kg/hr | 8.4 | 8.5 |
| Stock melt temp., °C. | 263 | 261 |
| Polymer A3, % | 100 | 90 |
| Polymer B1, % | 0 | 10 |
| Flex modulus, MPa | 1379 | 1207 |
| Notched Izod, J/m | 96 | 907 |

The comparison suggests that the conventional toughening method improves the toughness at the expense of the stiffness (Comp. 1 vs. Contr. 1), while the present invention improves the toughness without decreasing the stiffness, and in some cases even increases the stiffness.

EXAMPLES 18–21

In these example, nylon 12,12 (Polymer A2) was used. All the polymer blends were extruded with Machine M1. All the samples were molded at 270° C. The experimental data are given in Table 6, below. Comparing these results with data for the control polyamide A2 (taken from a sales bulletin), one sees that toughness was increased without decreasing stiffness.

TABLE 6

| | Example | | | | |
|---|---|---|---|---|---|
| | 18 | 19 | 20 | 21 | Contr. 2* |
| Rev./min. | 200 | 250 | 250 | 250 | N/A |
| Prod. rate, kg/hr. | 5.4 | 16.5 | 16.9 | 16.1 | N/A |
| Stock melt temp., °C. | 357 | 332 | 332 | 323 | N/A |
| Polymer A2, % | 85 | 80 | 70 | 80 | 100 |
| Polymer B1, % | 5 | 5 | 10 | 5 | 0 |
| Polymer C1, % | 10 | 15 | 20 | 0 | 0 |
| Polymer C2, % | 0 | 0 | 0 | 10 | 0 |
| Flex, modulus, MPa | 1482 | 1620 | 1413 | 1482 | 1344 |
| Notched, Izod, J/m | 801 | 747 | 961 | 534 | 58.7 |
| Tensile strength, MPa | 43.4 | 41.4 | 39.3 | 41.4 | 41.4 |
| Elongation at break, % | 35 | 40 | 50 | 40 | 27 |

*Commercial polyamide. All data taken manufacturer's technical bulletin

EXAMPLES 22–24

These examples show that the process of this invention can be carried out in a commercial scale production equipment such as Extruders M3 and M4. Examples 23 and 24 also show that glass fibers can be added to the blend to further improve stiffness.

The composition of Example 22 was an 80:10:10% blend of A1, B1, and C1, made in Extruder M3 operated at a rate of 74.4 kg/hr, the stock melt temperature being 300° C. The blend pellets were dried at 100° C. under vacuum and molded at 240° C.

The blends of Examples 23 and 24 were made in Extruder M4 from the blend of Example 22, feeding glass fibers through the side port. The glass fibers were of type PPG3540®(Pittsburgh Plate Glass Co.). The polymer blend pellets were introduced first. The temperature setting of the extruder barrel was 270° C. Test bars were molded at 240° C. The compositions and test data are reported below in Table 7.

TABLE 7

| | Example | | |
|---|---|---|---|
| | 22 | 23 | 24 |
| Blend from Example 22, pts. | 100 | 95 | 90 |
| Glass fibers, pts. | 0 | 5 | 10 |
| Flex modulus, MPa | 2482 | 2758 | 3103 |
| Notched Izod, J/m | 1281 | 400 | 240 |

While a good improvement of stiffness could have been expected, the notched Izod values are unexpectedly good. Usually, addition of as little as 5% of glass fibers, decreases the notched Izod value below 160 J/m. The impact strength in Examples 24 and 25 is below the values obtained in all the previous examples of this disclosure but still is far better than that of the polyamide A1 alone, given in Table 1 as 53.4 J/m. Comparison with commercial glass fiber-reinforced toughened nylon 6 (DuPont's ZYTEL® 71G13L, which contains 13% of glass fibers) also shows the superior impact strength of the blend of the present invention. The commercial glass fiber-reinforced material has a flex modulus of 3792 MPa but a notched Izod impact strength of only 123 J/m.

ANALYTICAL METHODS (Examples An-1 to An-9)

Examples An 1 -An 3—Dynamic Mechanical Analysis

These examples show a correlation of the improved mechanical properties of the compositions of the present invention with the process conditions via Dynamic Mechanical Analysis (DMA) according to ASTM Standard D-4092–90. All the compositions were A1/B1/C2 in respective amounts of 80:10:10 %, and were extruded in Extruder M1. The samples of Examples An 2 and An 3 were identical with those of Examples 1 and 2, respectively, reported above. The Δt value is the difference between the DMA temperature of the polycarbonate peak and of the nylon peak. The mechanical properties of the samples are given in Table 8.

TABLE 8

|  | Example | | |
|---|---|---|---|
|  | An 1 | An 2 | An 3 |
| Stock poly, temp., °C. | 252 | 304 | 300 |
| Molding temp., °C. | 240 | 240 | 260 |
| Flex mod., MPa | 2227 | 2923 | 3172 |
| Notched Izod, J/m | 160 | 1121 | 907 |
| DMA ANALYSIS | | | |
| Nylon peak, °C. | 70 | 75 | 74 |
| Polycarbonate peak, °C. | 151 | 145 | 131 |
| Δt, °C. | 81 | 70 | 57 |

Figure 1:
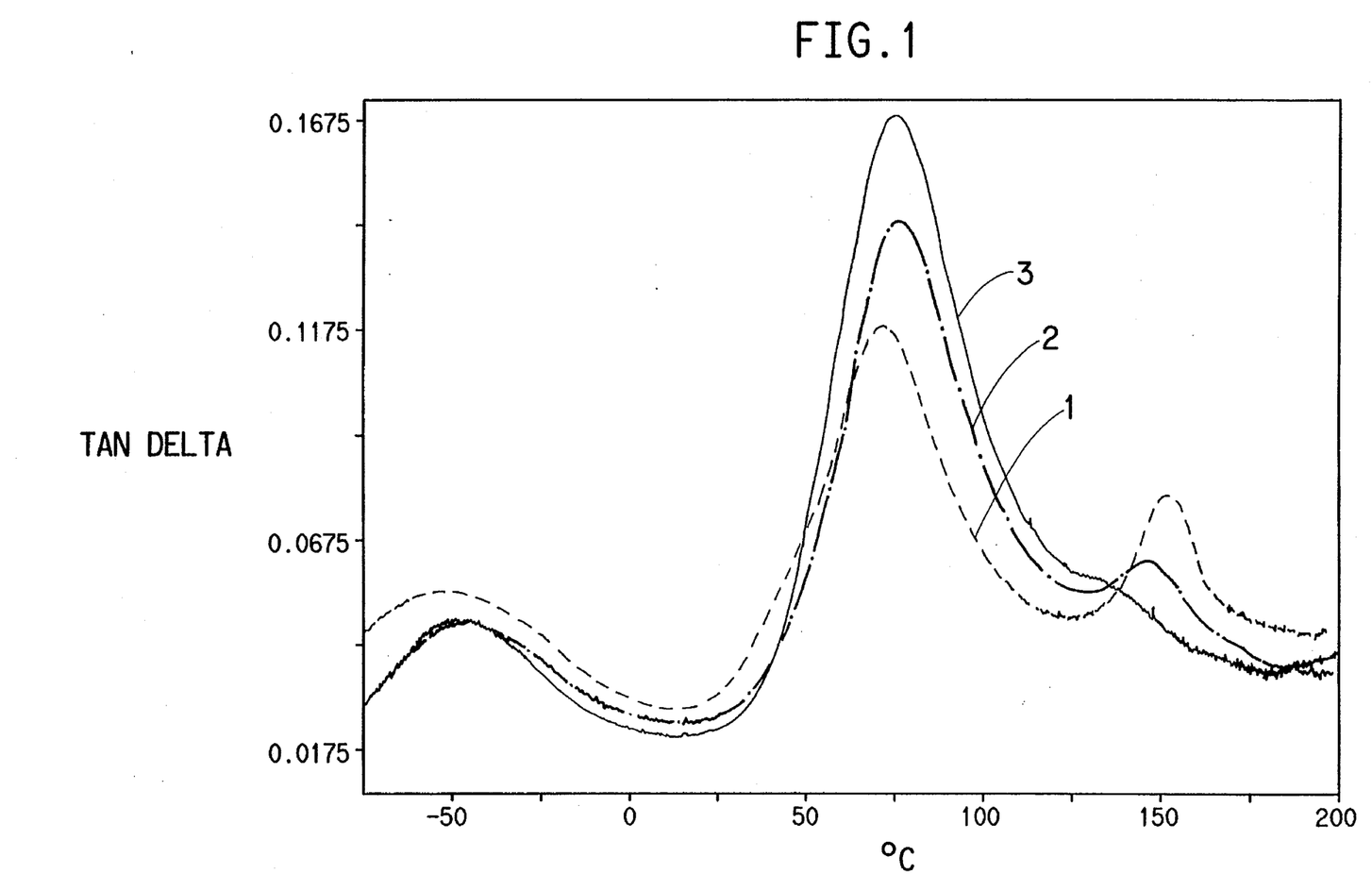
FIG. 1 is a plot of tangent delta (or damping peak) vs. scanning temperature, obtained for a representative sample of a blend of the present invention by dynamic mechanical analysis.

FIG. 1 is a plot of tan 6 (or damping peak) vs. scanning temperature. Curve 1 is for the above Example An 1; curve 2 for Example An 2; and curve 3 for example An 3. These curves show that the higher the processing temperature the lower is the carbonate damping peak, and that Δt is smaller.

One can further conclude from the above data that the smaller the Δt value the better is the stiffness/toughness combination.

Examples An 4-An 7, Infrared Spectroscopy (IR)

These examples correlate the mechanical properties of the polymer blends of the present invention with the process conditions by means of infrared spectroscopy. All the blends had the composition A1/B1/C2, in respective amounts of 80:10:10% and were extruded in Extruder M1. The information is reported in Table 9, below.

TABLE 9

|  | Example | | | |
|---|---|---|---|---|
|  | An 4 | An 5 | An 6 | An 7 |
| Stock melt temp., °C. | 283 | 304 | 304 | 304 |

TABLE 9-continued

|  | Example | | | |
|---|---|---|---|---|
|  | An 4 | An 5 | An 6 | An 7 |
| Molding temp, °C. | 240 | 240 | 260 | 270 |
| Flex modulus, MPa | 2455 | 923 | 2827 | 2827 |
| Notched Izod, J/m | 320 | 121 | 1174 | 961 |
| Infrared peak normalized area | | | | |
| Nylon | 1 | 1 | 1 | 1 |
| Polycarbonate | 0.93 | 0.74 | 0.61 | 0.32 |
| Ratio: polycarbonate/nylon area | 0.93 | 0.74 | 0.61 | 0.32 |

Figure 2:
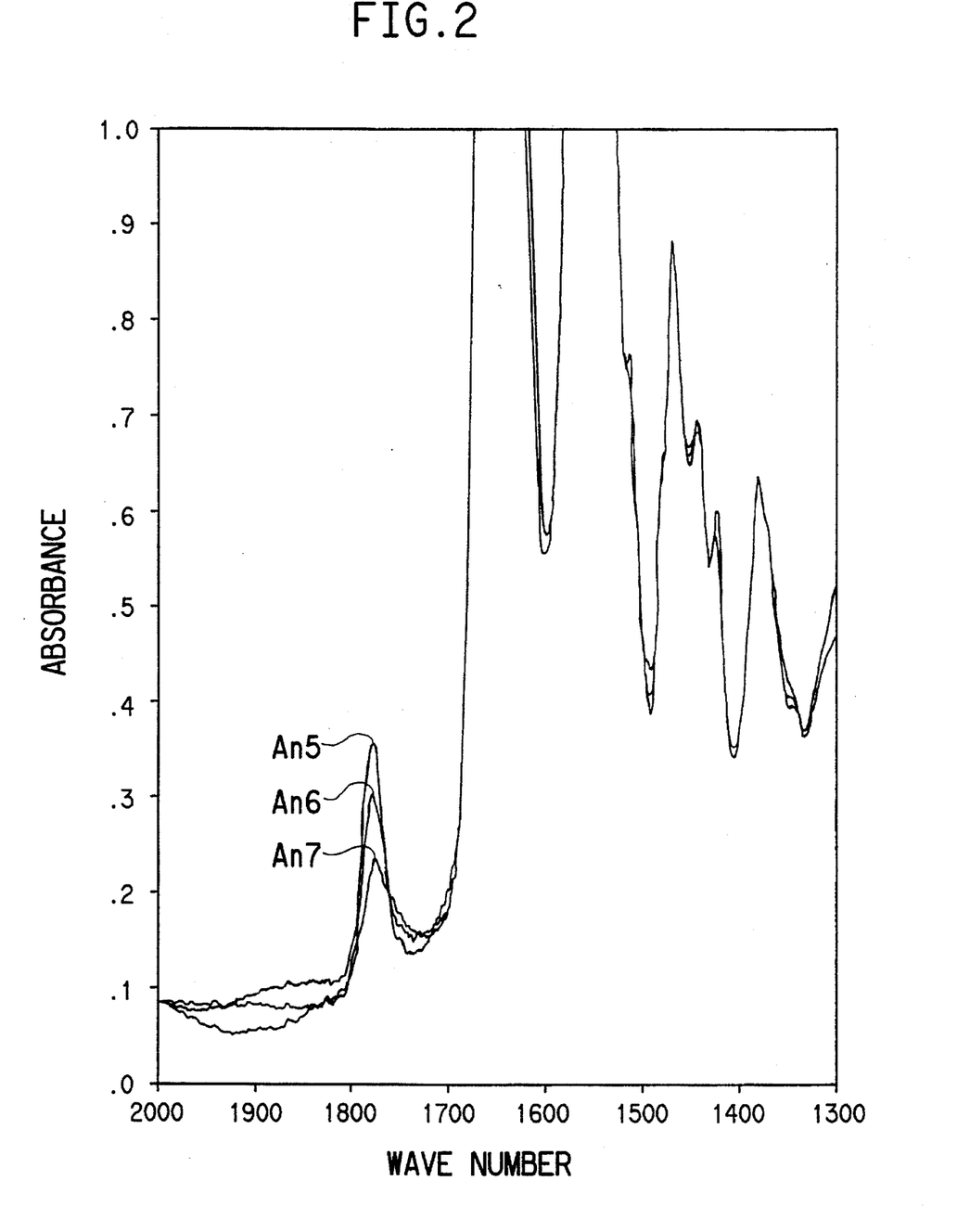
FIG. 2 represents three plots of absorbance vs. wave number, obtained for different blend samples by infrared analysis.

FIG. 2 is a plot of absorbance vs. the wave number. Curve 5 refers to example An 5; curve 6 to example An 6; and curve 7 to Ex An 7. These curves show that the higher the processing temperature the lower is the absorbance of the carbonate bond.

The nylon peak was taken at 1375 $cm^{-1}$ and the polycarbonate peak at 1775 $cm^{-1}$. The initial area ratio of the polycarbonate peak to the nylon peak will depend on, but will not necessarily be the same as, the weight ratio of the starting materials. However, for the same weight ratios of blend polymers, the smaller the peak area ratio the better is the toughness/stiffness combination.

Examples An 8 and An 9, Nuclear Magnetic Resonance (NMR)

Figure 3A:
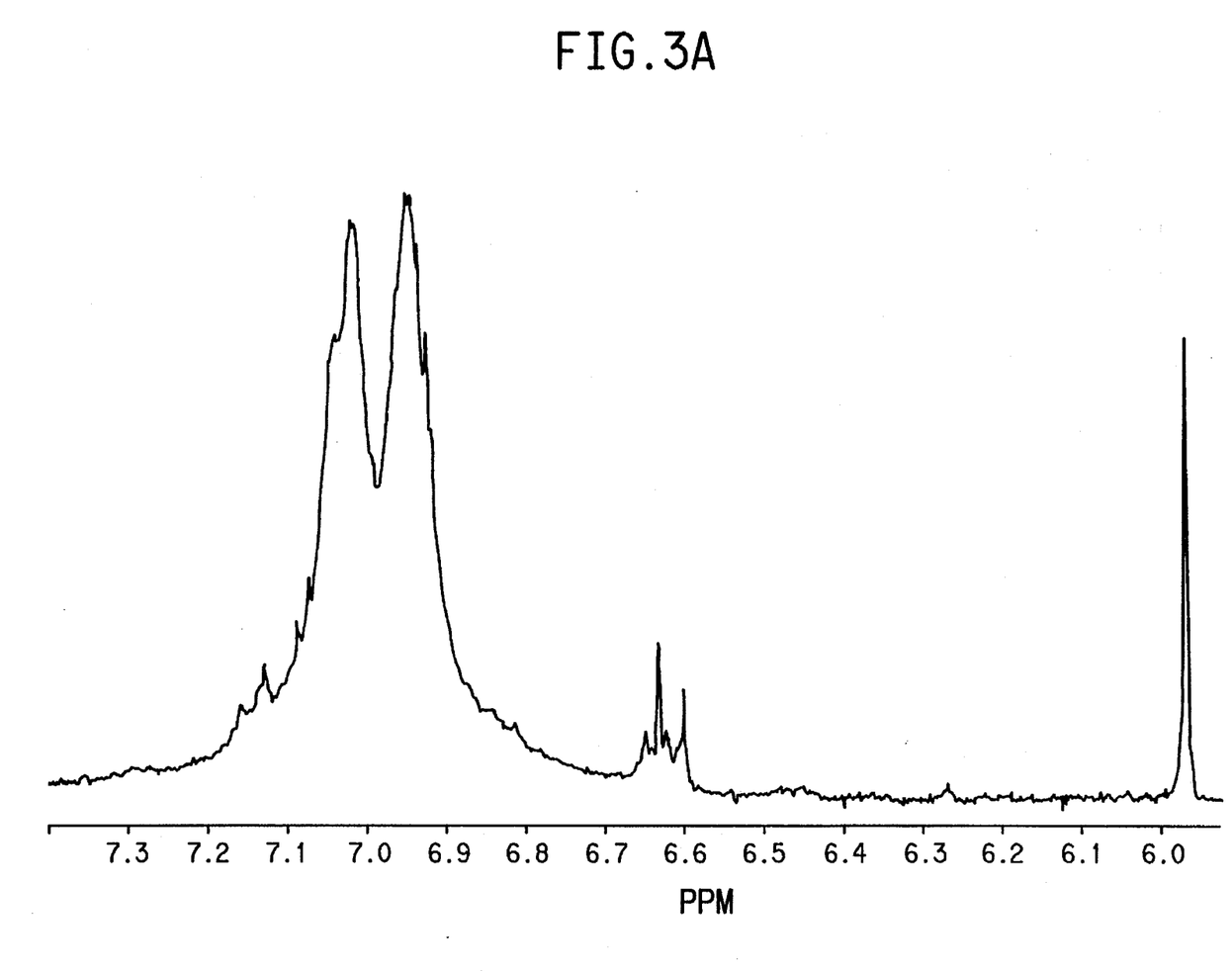
FIGS. 3A and 3B represent two plots of the signal of aromatic hydrogen atoms vs. chemical shift, in ppm, obtained for different blend samples by nuclear magnetic resonance analysis.
Figure 3B:
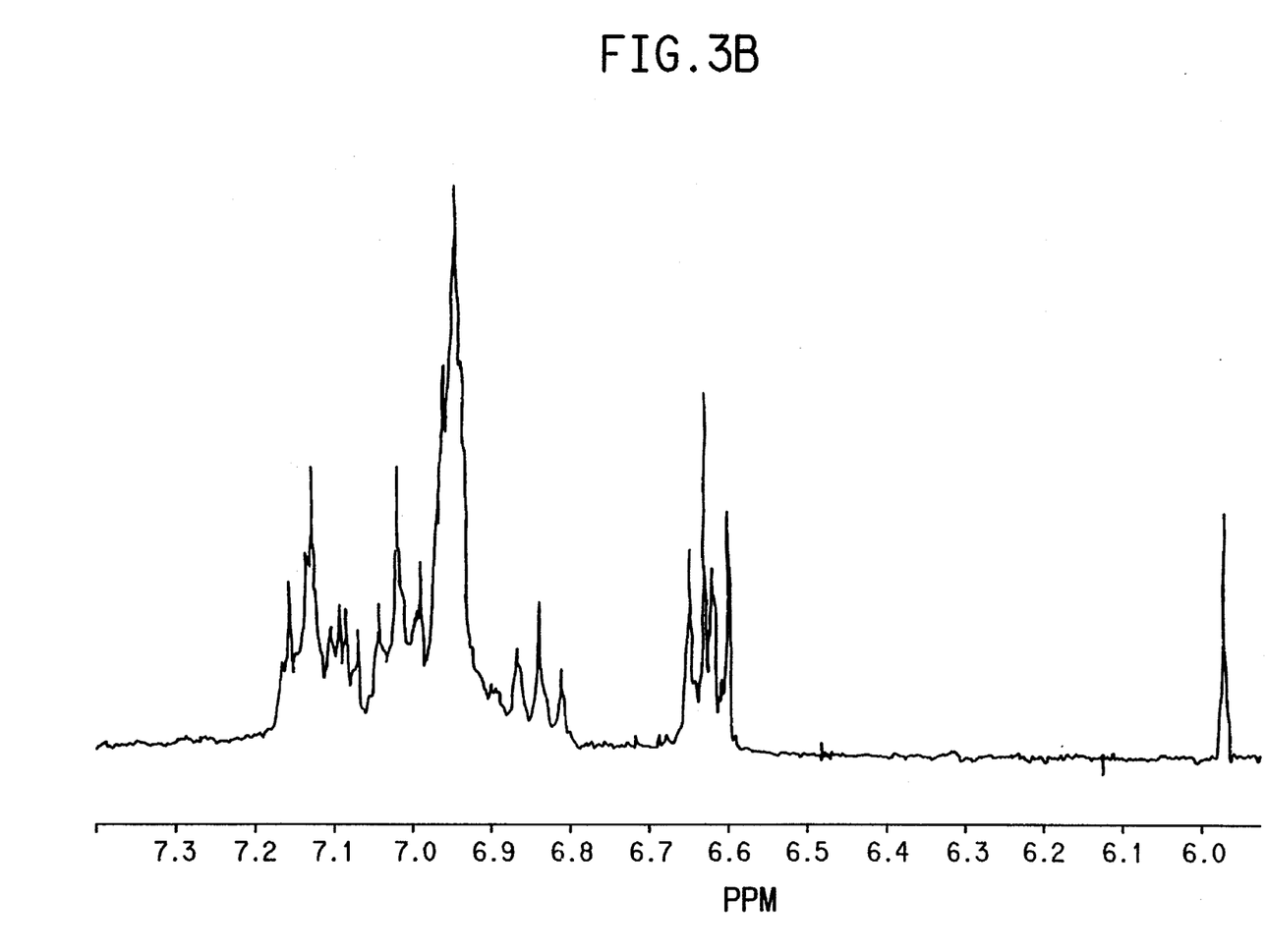

These examples correlate the mechanical properties and the process conditions by means of HNMR. Both examples had the same composition, A1/B1/C2 in respective amounts of 80:10:10%. However, the process conditions were different, and this affected the mechanical properties of the blends. FIG. 3A represents the sample of Example An 8, while FIG. 3B represents the sample of Example An 9. The extrusion and molding conditions were identical for Examples An 4 and An 8. They also were identical for Examples An 7 and An 9, Extrusion conditions were identical for Examples An 5, An 6, and An 9, but the molding conditions of Examples An 5 and An 6 were different from those of Example An 9. The effect of process conditions can be shown by measuring the ratio of the peak areas at 7 and 6.6 ppm. Hydrogen atoms on polycarbonate aromatic rings are mainly located in the area of 6.9–7.1 ppm, as can be seen in FIG. 3A. Processing at a high temperature results in a strong peak at 6.6. ppm, which can be well seen in FIG. 3B. It also is present in FIG. 3A but is weak. While the optimum peak area ratio depends on the starting amounts of nylon and polycarbonate, it appears that improved properties of the blend are observed for a smaller ratio. In both examples, Extruder M1 was used. The results are presented in Table 10, below.

TABLE 10

|  | Example | |
|---|---|---|
|  | An 8 | An 9 |
| Stock polymer temp., °C. | 283 | 304 |
| Molding temp., °C. | 240 | 270 |
| Flex modulus, MPa | 2455 | 2827 |
| Notched Izod, J/m | 320 | 961 |
| NMR | | |
| Area under 7 ppm peak | 12.8 | 57.3 |
| Area under 6.6 ppm peak | 0.35 | 18.2 |
| Peak area ratio, 7/6.6 ppm | 37 | 3.2 |

While the analytical methods described above provide some information about the blend products, the values of the various readings obtained cannot be quantitatively correlated with any well-defined composition. These analytical results can be roughly rationalized as follows:

DMA shows gradual disappearance of the polycarbonate and formation of a new chemical component of unknown structure. This new component may be responsible for the improved toughness/stiffness combination.

IR analysis also suggests that some polycarbonate bonds are destroyed to form a new chemical component.

The NMR spectrum is responsive to hydrogen atoms on the aromatic ring of polycarbonate. As a result of the above-discussed unknown chemical changes, the hydrogen atoms are no longer in the same magnetic field.

ADDITIONAL EXAMPLES OF THE INVENTION

EXAMPLES 25–30

Blends of Polymers A1, B 1, and C2 in respective percentages of 80:10:10% were made in Extruder M1 operated at 200 rev./min. The extruded materials were molded at a temperature of 240° C., with a mold at 60° C., and a 20 sec/20 see cycle. The properties of those blends vary considerably with the extrusion temperature, as is shown in Table 11, below.

TABLE 11

|  | Example | | | | | |
| --- | --- | --- | --- | --- | --- | --- |
|  | 25 | 26 | 27 | 28 | 29 | 30 |
| Stock melt temp., °C., | 269 | 276 | 282 | 294 | 304 | 336 |
| Flex modulus, MPa | 2260 | 2210 | 2460 | 2750 | 2920 | 2870 |
| Notched Izod, J/m | 160 | 213 | 320 | 1280 | 1120 | 1170 |

As can be seen, the increase of both notched Izod impact strength and flex modulus with the increase of stock melt temperature from 282° C. to 294° C. is dramatic.

EXAMPLES 31–32

A polymer blend A1/B1/C1, 85:5:10%, was prepared in Extruder M1 at two different stock melt temperatures. The molding conditions were the same as in Example 30. The results are shown in Table 12, below.

TABLE 12

|  | Example | |
| --- | --- | --- |
|  | 31 | 32 |
| Stock melt temp., °C. | 251 | 330 |
| Rev./min | 100 | 150 |
| Flex mod., Mpa | 2290 | 2830 |
| Notched Izod, J/m | 123 | 1120 |

Here again, the increase of both notched Izod impact strength and flex modulus with increase of stock melt temperature from 25 1° C. to 330° C. is dramatic.

EXAMPLES 33–34

A polymer blend of A1/B1/C1, 70:10:20%, was prepared at two different stock melt temperatures. Here again, the increase of notched Izod impact strength with higher processing temperature was remarkable, as show in Table 13, below.

TABLE 13

|  | Example | |
| --- | --- | --- |
|  | 33 | 34 |
| Stock melt temp., °C. | 270 | 322 |
| Rev./min | 184 | 150 |
| Flex modulus, MPa | 1860 | 2340 |
| Notched Izod, J/m | 373 | 1170 |

I claim:

1. A process for making a supertough polymer blend composition, said process consisting in blending the following components A, B, and C in the indicated proportions:

C, 2–30% of an engineering grade polycarbonate resin;

B, 3–20%, total, of at least one elastomeric compatibilizing agent carrying 0.1–5% of at least one pendant group selected from the group consisting of succinic anhydride groups and epoxide groups; and A, 50–95% of an engineering grade polyamide resin selected from the group consisting of nylon 6, nylon 11, nylon 12, nylon 6,12, nylon 12,12, and mixtures of two or more of those polyamides; the amount of polyamide A always being equal to 100% -(B%+C%);

all the above percentages being by weight;

under such conditions that the stock melt temperature is within the range of 300° C. to 350° C., inclusive, for a sufficient time to obtain a uniform dispersion of the polycarbonate and compatibilizing agent in a polyamide matrix;

the resulting blend having a flexural modulus, as determined according to the ASTM Standard D790, that is always at least as high as the lower of that of the polyamide and of the polycarbonate:

said blend consisting essentially of a polyamide matrix and a dispersed phase consisting of the polycarbonate and the compatibilizing agent.

2. A process of claim 1 wherein the amount of pendant groups in the compatibilizing agent is 0.3–3% by weight.

3. A process of claim 1 or 2 wherein the polyamide is nylon 6, nylon 12, or nylon 12,12.

4. A process of claim 1 or 2 wherein the compatibilizing agent is selected from the group consisting of EP rubber grafted with a monomer providing succinic anhydride groups, EPDM rubber grafted with a monomer providing succinic anhydride groups, EP rubber grated with glycidyl methacrylate, EPDM rubber grated with glycidyl methacrylate, ethylene/n-butyl acrylate/glycidyl methacrylate terpolymer. styrene/ethylene-butylene-/styrene copolymer grafted with maleic anhydride, ethylene/n-butyl acrylate/carbon monoxide terpolymer grafted with maleic anhydride, and ethylene/n-butyl acrylate/carbon monoxide terpolymer grafted with glycidyl methacrylate.

5. A process of claim 1 wherein the polyamide is nylon 6 or nylon 6,12, which is present in an amount of 70–85%, the respective amounts of polycarbonate and of compatibilizing agent being 5–15% and 10–15%.

6. A process of claim 1 wherein the polyamide is nylon 11, nylon 12, or nylon 12,12, which is present in an amount of 55–90%, the respective amounts of polycarbonate and of compatibilizing agent being 5–30% and 5–15%.

7. A polymer blend consisting of a polyamide matrix and a dispersed phase of polycarbonate and a compatibilizing agent, said blend being made by the process of any one of claims 1, 2, 5 or 6.

8. A polymer blend comprising a polyamide matrix and a dispersed phase of polycarbonate and a compatabilizing agent, said blend being made by the process of claim 3.

9. A polymer blend comprising a polyamide matrix and a dispersed phase of polycarbonate and a compatabilizing agent, said blend being made by the process of claim 4.

* * * * *